(12) United States Patent
Morita

(10) Patent No.: US 6,373,996 B2
(45) Date of Patent: *Apr. 16, 2002

(54) APPARATUS AND METHOD FOR READING AND REPRODUCING IMAGE

(75) Inventor: Naoyuki Morita, Kanagawa (JP)

(73) Assignee: Fuji Photo Film Co., Ltd., Minami-Ashigara (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,551

(22) Filed: Jan. 12, 1999

(30) Foreign Application Priority Data

Jan. 12, 1998 (JP) .......................... 10-003883

(51) Int. Cl.⁷ ................................ G06K 9/36
(52) U.S. Cl. ..................... 382/284; 382/282; 348/99; 348/97; 348/96
(58) Field of Search ................ 382/284, 287, 382/286, 282, 321, 323; 348/335, 112, 589, 207, 96, 97, 99, 100; 235/462.05

(56) References Cited

U.S. PATENT DOCUMENTS

| 5,457,753 | A | * | 10/1995 | Sasahara ..................... 382/275 |
| 5,606,630 | A | * | 2/1997 | Maeda et al. ................ 382/254 |
| 5,686,960 | A | * | 11/1997 | Sussman et al. ............. 348/218 |
| 5,731,888 | A | | 3/1998 | Arai |
| 5,844,226 | A | * | 12/1998 | Suzuki ....................... 235/462 |
| 5,982,941 | A | * | 11/1999 | Loveridge et al. .......... 382/260 |
| 6,034,785 | A | * | 3/2000 | Itoh ........................... 358/1.18 |
| 6,084,988 | A | * | 7/2000 | Kanno et al. ............... 382/289 |
| 6,157,435 | A | * | 12/2000 | Slater et al. .................. 355/40 |

FOREIGN PATENT DOCUMENTS

JP    5323470    12/1993

* cited by examiner

Primary Examiner—Bhavesh Mehta
Assistant Examiner—Yosef Kassa

(57) ABSTRACT

There are provided an image reading and reproducing apparatus comprising a scanner for photoelectrically reading an image carried on a film to obtain digital input image data; an image processing section for subjecting the digital input image data to specified image processing steps to obtain processed image data; a line image acquiring section for acquiring digital line image data of a line image; an image combining section for combining the processed image data with the digital line image data to create output composite image data and a printer for scanning and exposing a light-sensitive material in accordance with the output composite image data at one step to record a composite image en the light-sensitive material, as well as an image reading and reproducing method applied to the above apparatus. The apparatus and method are capable of simply inserting characters and pictures on the surface of a print in accordance with the designation by a user without obstructing an image.

18 Claims, 4 Drawing Sheets

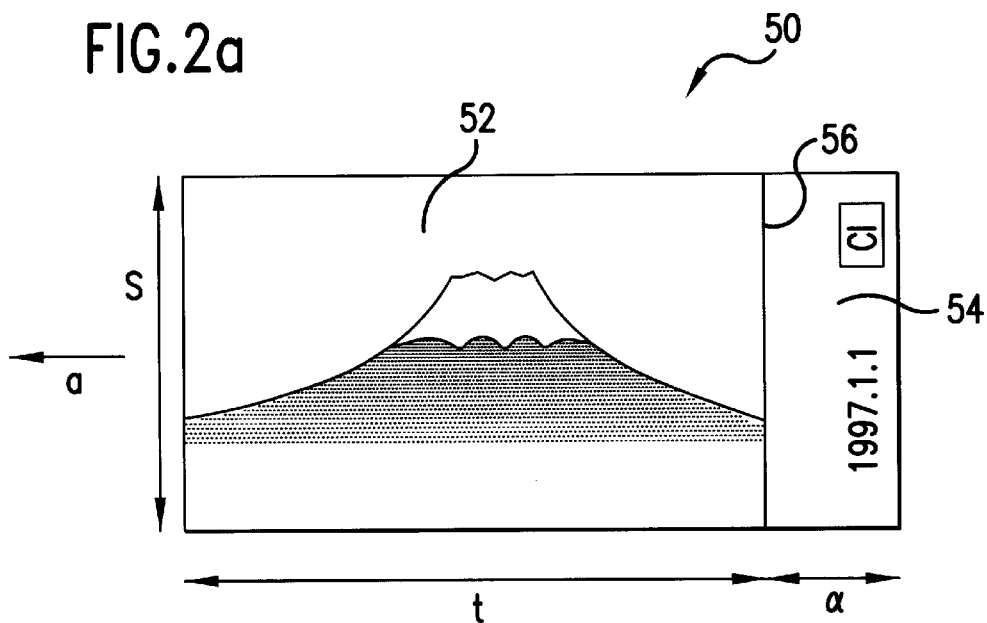
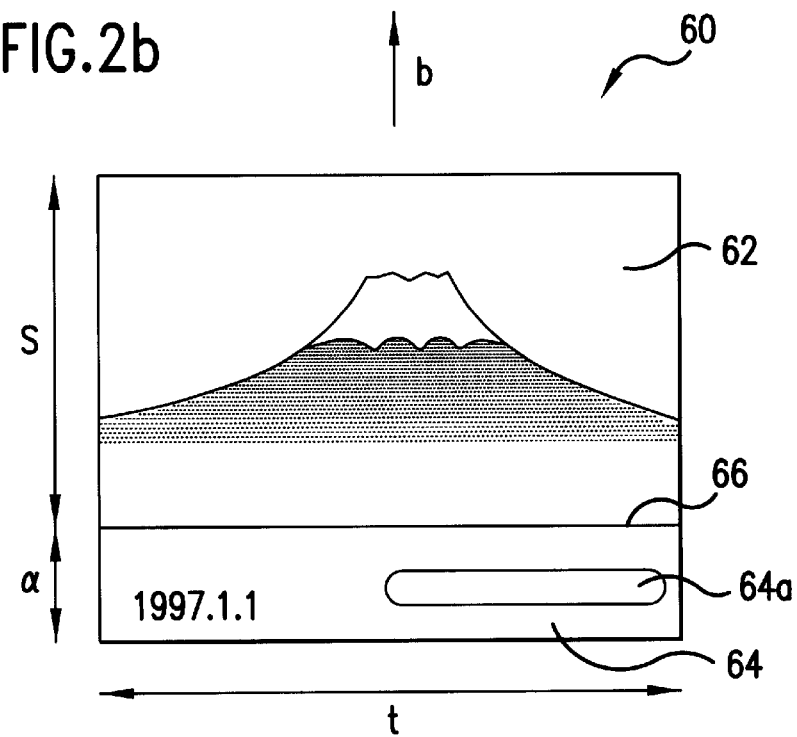

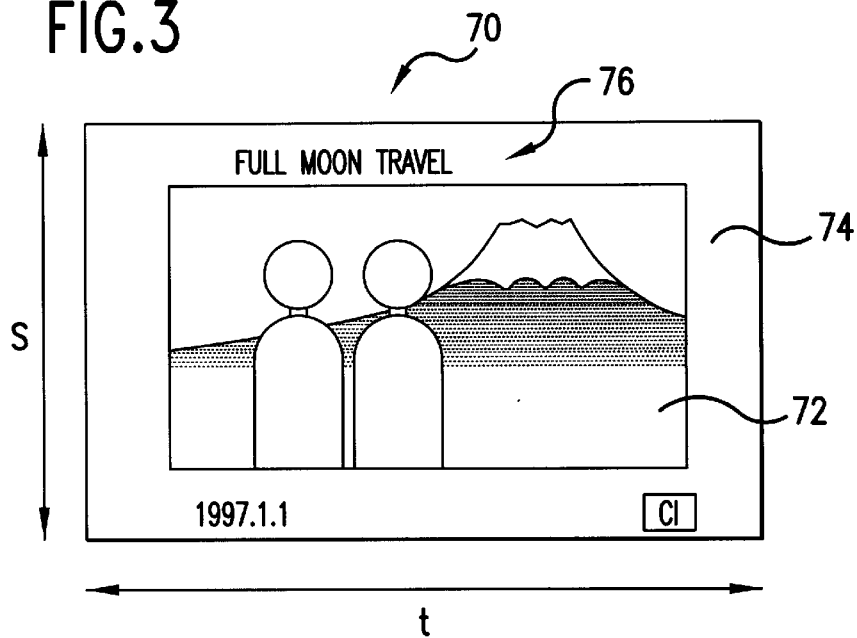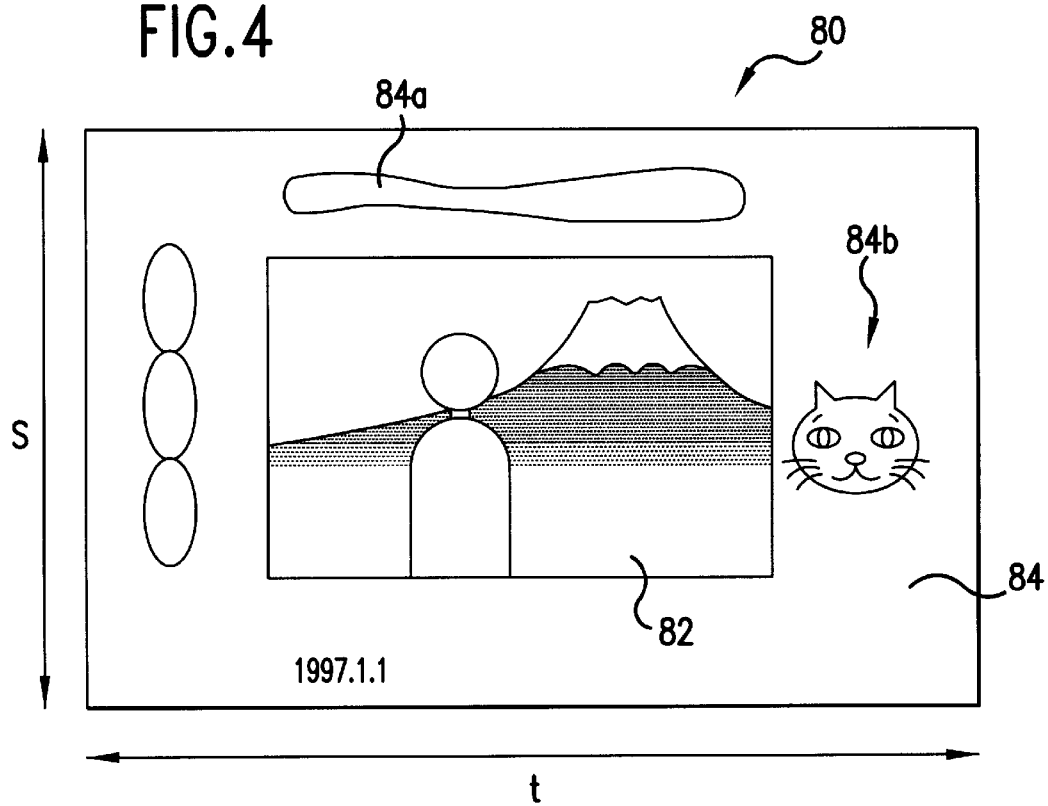

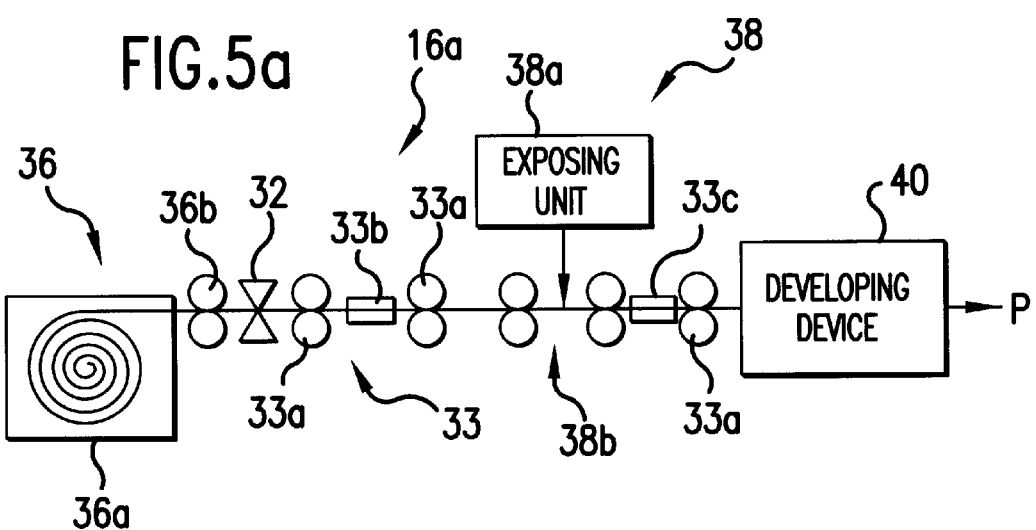
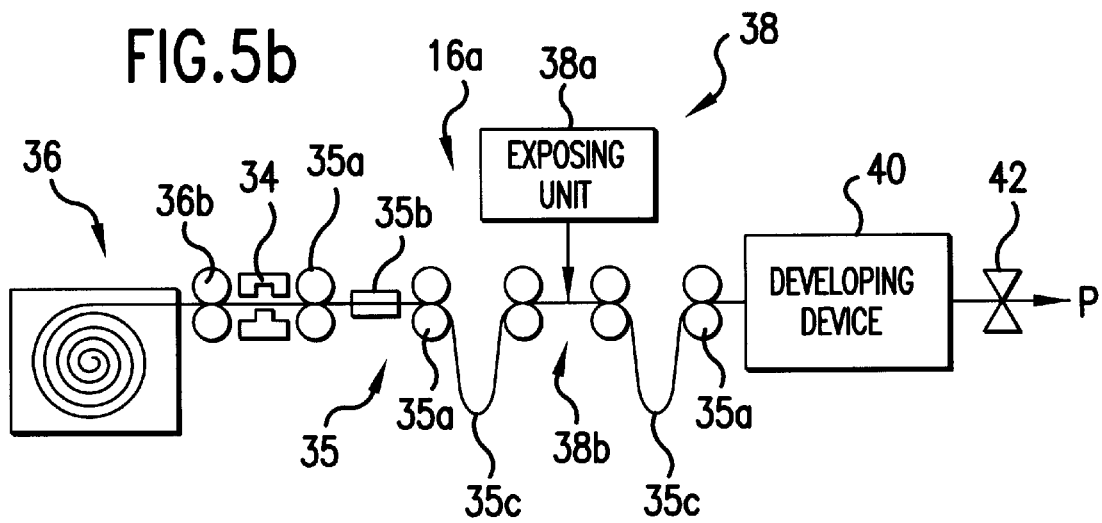

APPARATUS AND METHOD FOR READING AND REPRODUCING IMAGE

BACKGROUND OF THE INVENTION

The present invention relates to an image reading and reproducing apparatus for photoelectrically reading the image recorded on a film as image data, subjecting the read image data to specified image processing steps, preparing an output composite image data by combining the processed image data and line image data and recording a composite image on a light-sensitive material by scan exposure at one step using the output composite image data. The present invention also relates to an image reading and reproducing method which is applied to the above apparatus.

Most of the images recorded or carried on photographic films such as negatives and reversals (which are hereinafter referred to as "films") are conventionally printed onto light-sensitive materials such as photographic papers by so-called "direct exposure" (analog exposure) in which the image on a film is projected onto the light-sensitive material for areal exposure.

At the time, since the periphery of a cut sheet prepared by cutting a light-sensitive material to a specified size is held by a mask attached to the cut sheet because of the technical necessity that the cut sheet must be properly held with respect to projected light, there inevitably exists a non-exposed white edge region around an image in a finished print.

Then, a photographed date, CI (Corporate Identity) mark and the like have been printed in the white edge region by multiple exposure using a lithographic film or the like.

To print characters, marks and the like in the white edge region, exposure must be performed using the lithographic film by shading the image print region of a light-sensitive material with a dedicated mask in addition to the exposure of an image from a film and this exposure must rely on very troublesome multiple exposure.

Thereafter, there are employed as a result of technical innovation such methods that a cut sheet is held on an exposure guide by being sucked by vacuum, and that when a roll-shaped light-sensitive material is exposed in a state of an elongated web without being cut, it is held on the exposure guide by tension, whereby the mask is made unnecessary and photographs without white edge go mainstream at present.

Recently, there have become commercially practical digital photoprinters making use of digital exposure in which image information recorded on a film is photoelectrically read, converted to digital image data and subjected to various digital image processing steps, thereby recording an image using the processed digital image data. In the digital photoprinters, the image data of characters is created by image data processing and assembled to the image data of the image recorded on a film to thereby create a composite image (composite image data) in which the image recorded on the film is combined with the characters and exposure can be performed using the composite image data. Therefore, expressions which are more freely created than a typical expression such as a photographed date and the like made by the conventional lithographic film or the like can be recorded in the image on the surface of a photograph.

Further, in the Advanced Photo System (APS) released recently, various kinds of information can be recorded in the magnetic recording medium formed on a film. Since the magnetic information includes the title of an image and the like, not only the photographed date and the like which are conventionally recorded, but also the title and the like can be recorded in the image on the surface of a print by reading the magnetic information when the print is made at a laboratory.

However, in the method of recording characters in the white edge of a print using the conventional lithographic film, the multiple exposure must be performed for printing a line image such as characters and the like using the lithographic film dedicated for the line image in addition to the print of an image recorded on a film. Then, the dedicated mask is necessary for the above multiple exposure and the lithographic film must be prepared for each image. In particular, since a block copy must be made for each image and exposed and developed to prepare the lithographic film, there is a problem that the correction of the block copy is troublesome and time-consuming.

Characters can be somewhat freely printed on the surface of a photograph by means of the digital photoprinter or the APS. When characters are inserted in the image of a print, however, there is such a problem in quality that it is difficult to find the characters depending upon a background image or the characters obstruct the image on the contrary. Thus, some users do not prefer inserting characters in an image.

SUMMARY OF THE INVENTION

An object of the present invention made in view of the above conventional problems is to provide an image reading and reproducing apparatus capable of simply inserting characters and pictures on the surface of a print in accordance with the designation by a user so that they do not obstruct an image. Another object of the present invention is to provide an image reading and reproducing method which is applied to the above apparatus.

To solve the above problems, a first aspect of the present invention provides an image reading and reproducing apparatus comprising:

image reading means for photoelectrically reading an image carried on a film to obtain digital input image data;

image processing means for subjecting said digital input image data to specified image processing steps to obtain processed image data;

line image acquiring means for acquiring digital line image data of a line image including at least one of a character, characters, a picture and pictures;

image combining means for combining said processed image data with said digital line image data to create output composite image data in such a way that an image region where said image carried on said film is recorded and a title region in addition to said image region are formed in a light-sensitive material and said line image is recorded in said title region; and image recording device for scanning and exposing said light-sensitive material in accordance with said output composite image data at one step to record a composite image on said light-sensitive material.

According to the first aspect of the invention, there is also provided the image reading and reproducing apparatus which further includes:

image size determining means for determining a length in an auxiliary scanning transport direction of the light-sensitive material on which said composite image is to be recorded, based on said image region in which said image is to be recorded in accordance with said processed image data, and said title region in which said line image is to be recorded in accordance with said line image data;

light-sensitive material cutting means for previously cutting an elongated light-sensitive material to the determined length; and transport means for transporting the cut light-sensitive material to said image recording means.

According to the first aspect of the invention, there is further provided the image reading and reproducing apparatus which further includes:

image size determining means for determining a length in an auxiliary scanning transport direction of the light-sensitive material on which said composite image is to be recorded, based on said image region in which said image is to be recorded in accordance with said processed image data, and said title region in which said line image is to be recorded in accordance with said line image data;

cut-mark forming means for previously forming a cut-mark for indicating the determined length on an elongated light-sensitive material; and transport means for transporting said elongated light-sensitive material having the formed cut-mark to said image recording means.

It is preferred that said line image acquiring means comprises line image creating means for creating said digital line image data of said line image.

When said at least one of the character, the characters, the picture and the pictures contains at least handwritten one, said line image acquiring means preferably comprises line image reading means for reading said line image photoelectrically to obtain the digital line image data; or line image creating means for creating the digital line image data of a portion of said line image and line image reading means for reading remaining portion of said line image including said at least handwritten one photoelectrically to obtain the digital line image data.

Said title region is preferably provided on one or both sides of or around said image region, that is, at least on one side of said image region.

According to the first aspect of the invention, there is still further provided the image reading and reproducing apparatus which further includes control means for controlling said image processing means, said image reading means, said line image acquiring means, said image combining means and said image recording means, and optionally said image size determining means, together with said light-sensitive material cutting means and transport means, or said cut-mark forming means and said transport means.

According to a second aspect of the invention, there is provided an image reading and reproducing method comprising the steps of:

photoelectrically reading an image carried on a film to obtain digital input image data;

subjecting said digital input image data to specified image processing steps to obtain processed image data;

acquiring digital line image data of a line image including at least one of a character, characters, a picture and pictures;

combining said processed image data with said digital line image data to create output composite image data in such a way that an image region where said image carried on said film is recorded and a title region in addition to said image region are formed in a light-sensitive material and said line image is recorded in said title region; and scanning and exposing said light-sensitive material in accordance with said output composite image data at one step to record a composite image on said light-sensitive material.

According to the second aspect of the invention, there is also provided the image reading and reproducing method further comprising the steps of:

determining a length in auxiliary scanning transport direction of the light-sensitive material on which said composite image including said processed image data and said line image data is to be recorded, based on said image region in which said image is to be recorded in accordance with said processed image data, and said title region in which said line image is to be recorded in accordance with said line image data;

previously cutting an elongated light-sensitive material to the determined length; and transporting the cut light-sensitive material to an image recording means;

wherein said image recording means scans and exposes said light-sensitive material in accordance with said output composite image data at one step to record said composite image on said light-sensitive material which was previously cut.

According to the second aspect of the invention, there is further provided the image reading and reproducing method further comprising the steps of:

determining a length in auxiliary scanning transport direction of the light-sensitive material on which said composite image including said processed image data and said line image data is to be recorded, based on said image region in which said image is to be recorded in accordance with said processed image data, and said title region in which said line image is to be recorded in accordance with said line image data;

previously forming a cut-mark for indicating the determined length on an elongated light-sensitive material; and transporting said elongated light-sensitive material having the formed cut-mark to an image recording means;

wherein said image recording means scans and exposes said light-sensitive material in accordance with said output composite image data at one step to record said composite image on said elongated light-sensitive material having said formed cut-mark.

It is preferred that said digital line image data is at least one of the digital line image data created for said line image, and the digital line image data obtained by photoelectrically reading the line image including at least handwritten one as said at least one of the character, the characters, the picture and the pictures.

It is also preferred that said title region is provided at least on one side of said image region, or around said image region.

BRIEF DESCRIPTION OF THE DRAWINGS

FIG. 2a is a conceptual view showing an example of a finished print outputted by a first embodiment of the present invention;

FIG. 2b is a conceptual view showing another example of a finished print outputted by the first embodiment of the present invention;

FIG. 3 is a conceptual view showing an example of a finished print outputted by a second embodiment of the present invention; and FIG. 4 is a conceptual view showing another example of a finished print outputted by the second embodiment of the present invention.

FIG. 5a is a conceptual view showing the schematic arrangement of an example of a printer of the image reading and reproducing apparatus.

FIG. 5b is a conceptual view showing the schematic arrangement of an another example of a printer of the image reading and reproducing apparatus.

DETAILED DESCRIPTION OF THE INVENTION

Figure 1:
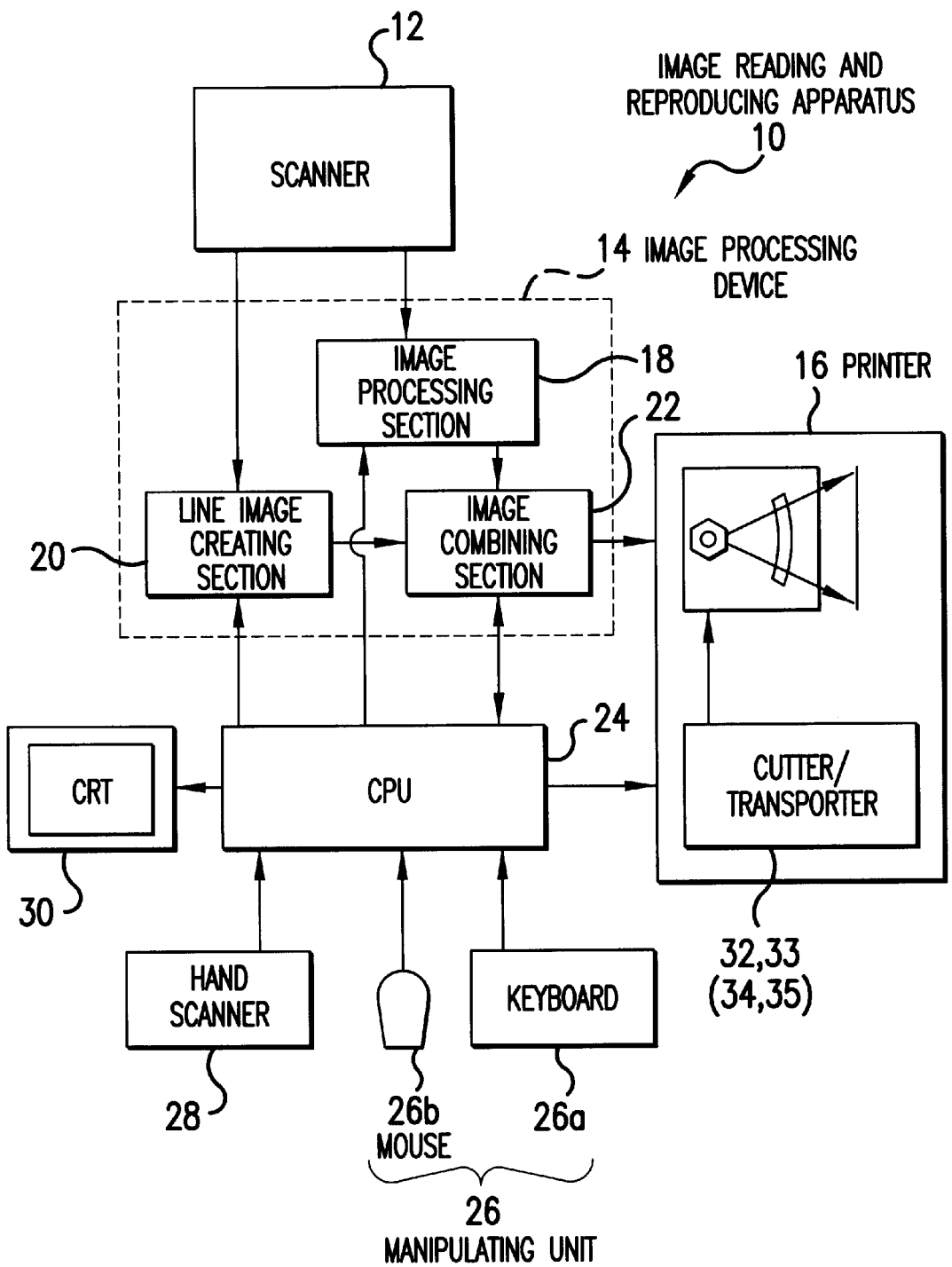
FIG. 1 is a block diagram showing the schematic arrangement of an example of an image reading and reproducing apparatus to which the present invention is applied.

An apparatus and method for reading and reproducing image of the present invention will be described below in detail based on the preferred embodiments shown in the accompanying drawings.

First, a first aspect of the image reading and reproducing apparatus of the present invention will be described. As a first embodiment of the image reading and reproducing apparatus of the invention, we now explain an apparatus to output finished prints each having a title region on one side or both sides of the image region of a specified size on the surface of the photograph. The invention is not however limited thereto.

FIG. 1 is a block diagram showing the schematic arrangement of an image reading and reproducing apparatus to which thee present invention is applied.

The image reading and reproducing apparatus 10 shown in FIG. 1 essentially includes a scanner (image reading device) 12 for photoelectrically reading the image recorded and carried on a film; an image processing device 14 for subjecting the read digital image data (image information) to various image processing steps including an electronic magnification processing step in accordance with a size of a finished print and for performing a characterizing step of the invention, that is, combining the processed image data with digital line image data of a line image such as a character, characters, a picture or pictures to output output composite image data corresponding to the size of the finished print in accordance with a light-sensitive material used now; and a printer (image recorder) 16 for performing imagewise scan exposure on a sheet-like light-sensitive material having a specified size into which a roll of an elongated light-sensitive material has been cut previously or the elongated light-sensitive material having cut-marks of a specified distance formed thereon with light beams modulated in accordance with the composite image data processed and combined by the image processing device 14, developing the exposed light-sensitive material and outputting it as a finished print.

The image processing device 14 includes an image processing section 18 for performing the various image processing including color balance adjustment, color and density adjustment, gradation adjustment, electronic magnification, sharpness enhancement, dodging and the like on the image data, a line image creating section 20 for creating digital line image data from characters and pictures designated by a user and an image combining section 22 for combining the processed image data and the line image data to output the composite image data of both data.

The image reading and reproducing apparatus 10 as a whole and the respective devices are operated and controlled by a CPU (controller) 24. Connected to the CPU 24 are manipulating means 26 having a keyboard 26a and a mouse 26b through which various conditions are input (set), various kinds of processing are selected and indicated and the correction of color or density is indicated, a hand scanner (reading means) 28 for reading handwritten characters and pictures and a display (CRT) 30 for displaying the image read from a film by the scanner 12, various kinds of manipulations and indications, and pictures for setting and registering various conditions. The invention is not limited to the embodiments shown in the drawings. For example, the CPU 24 may be provided within the image processing device 14.

In the image reading and reproducing apparatus 10 of the invention, the CPU 24 functions as an image size determining unit which determines a length in an auxiliary scanning transport direction with respect to a length in a main scanning direction of the light-sensitive material on which the composite image is to be recorded in the printer 16 by digital image scan exposure, based on the image data processed by the image processing section 18 and the line image data created in the line image creating section 20. It should be noted that the length in the main scanning direction of the light-sensitive material in this embodiment is automatically determined by the size or width of the elongated light-sensitive material to be loaded in a light-sensitive material loading section 36 of the printer 16 as described later, as shown in FIG. 5a. The image data and the line image data are sent to the CPU 24 to determine the length in the auxiliary scanning transport direction of the light-sensitive material contain not only data on color and density of an image but also information such as print size and other adjunctive information of the image. The data of the length thus determined in the CPU 24 is sent to the printer 16, where a cutter 32 as a light-sensitive material cutting means previously cuts the light-sensitive material to the determined length in the auxiliary scanning transport direction by an instruction from the CPU 24 and a light-sensitive material transporter 33 transports the cut sheets of the light-sensitive material to an image recording section 38, as described later.

It should be however noted that the cutter 32 and the transport means 33 of the light-sensitive material may be replaced by a frame punch (punch) 34 as a cut-mark former and a light-sensitive material transporter 35 as shown in FIG. 5b to form only cut-marks by punching in cut-positions of the light-sensitive material, without actually cutting the light-sensitive material. That is, the punched elongated light-sensitive material is finally cut after having been transported to the printer 16 and subjected to image recording and development.

The scanner 12 is a device for photoelectrically reading images recorded on a film or the like frame by frame. In the scanner 12, the reading light emitted from a light source is uniformly dispersed after quantity and color adjustment, and is incident on the image of a frame of a film held at a specified reading position and passes therethrough. Projected light which carries the image of the frame recorded on the film can be thus obtained. The projected light is received by a CCD sensor and a signal outputted therefrom is amplified by an amplifier and subjected to A/D conversion to obtain digital input image data. Thereafter the digital input image data is sent to the image processing section 18. The image processing section 18 subjects the digital input image data to the various image processing.

An APS film has magnetic tracks formed on both the ends thereof in a width direction and information such as a photographed date, the title of an image can be recorded on the magnetic tracks. The scanner 12 is provided with a reading head for reading the magnetic information in the image reading and reproducing apparatus 10 associated with the APS film.

As shown in FIG. 5a, the printer 16 includes an image recording device including the light-sensitive material loading section 36, the cutter 32, the light-sensitive material transporter 33 and the image recording section 38, and a developing device 40 (the light-sensitive material processing device which is hereinafter referred to simply as a "processor".

In the light-sensitive material loading section 36 is loaded a light-sensitive magazine 36a which accommodates a roll of the elongated light-sensitive material within a light-proof case. A withdrawing roller pair 36b to withdraw the light-sensitive material from the magazine 36a is provided outside or inside the magazine 36a near the outlet of the light-sensitive material. As mentioned above, upon receipt of an instruction from the CPU 24, the cutter 32 previously cuts the elongated light-sensitive material withdrawn from the magazine 36a by the withdrawing roller pair 36b to the length in the auxiliary scanning direction which was determined in the CPU 24. The light-sensitive material cut to the specified length is transported by the light-sensitive material transporter 33 a multiplicity of transport roller pairs 33a and transport guides (not shown). During transport through the transporter 33, back print information is recorded with a back printer 33b, after which the light-sensitive material is transported to the image recording section 38. After image-wise exposure, the exposed sheets of the light-sensitive material are distributed by a distributor 33c in the main scanning direction and transported to the developing device 40 by the light-sensitive material transporter 33.

The image recording section 38 includes an exposing unit 38a and scan/transport unit 38b and records a latent image by two-dimensionally scanning and exposing the light-sensitive material in such a manner that the light-sensitive material is scanned in a main scanning direction approximately perpendicular to an auxiliary scanning direction with the light beams emitted from the exposing unit 38a and modulated in accordance with the digital composite image data combined by the image combining section 22 while being transported in the auxiliary scanning transport direction by the scan/transport means 38b.

The exposing unit 38a is a known light beam scanning device in which the three kinds of light beams modulated in accordance with the respective composite image data to be recorded and deflected in the main scanning direction and which correspond to the exposure of three primary colors are incident on a specified recording position where a main scanning line is drawn on the light-sensitive material and the light-sensitive material is scanned and exposed based on a center reference in which the center in the main scanning direction is matched to the center in the width direction of the light-sensitive material which is transported in the auxiliary scanning direction, and then the latent image of the composite image is formed on the light-sensitive material. The exposing unit 38a includes the three kinds of light sources for the three kinds of light beams, the three kinds of light beam modulators, a light deflector such as a polygonal mirror, an fθ lens, an optical path adjusting mirror and the like.

The developing device 40 subjects the light-sensitive material scan-exposed in the image recording section 38 to a wet development process including development, bleach-fixing and rinsing; the processed light-sensitive material is then dried and sorted. The developing device 40 includes wet processing baths including a color developing bath, a bleach-fixing bath, and rinsing baths, a drier and a sorter. Any known light-sensitive material processors can be used as the developing device.

The digital photoprinter and the image recording device for use therein are disclosed in detail in the commonly assigned U.S. patent application Ser. Nos. 09/048,258 and 09/048,263.

The printer 16 used in the invention is not limited to the case where the elongated light-sensitive material is subjected to a digital scan exposure after having been previously cut to the size of the composite image, as shown in FIG. 5a, and cut-marks may be previously formed on the elongated light-sensitive material in accordance with the size of the composite image so that the elongated light-sensitive material which are not cut to sheets is subjected to the digital scan exposure, as shown in FIG. 5b.

That is, the printer 16 shown in FIG. 5b includes an image recording device including a light-sensitive material loading section 36, a frame punch 34 which functions as a cut-mark former, a light-sensitive material transporter 35 and an image recording section 38, a developing device 40 (light-sensitive material processing device which is also hereinafter referred to simply as a "processor"), and a cutter 42.

The printer 16 shown in FIG. 5b is quite the same as the printer shown in FIG. 5a except that the cutter 32 and the light-sensitive material transporter 33 of the latter are replaced by the frame punch 34 and the light-sensitive material transport means 35 and that the cutter 42 is added. Then, the same components are referenced by the same numerals and the description thereof is omitted.

As mentioned above, upon receipt of an instruction from the CPU 24, the frame punch 34 previously punches the elongated light-sensitive material withdrawn from the magazine 36a by the withdrawing roller pair 36b in accordance with the length in the auxiliary scanning transport direction which was determined in the CPU 24, thereby forming cut-marks thereon. The elongated light-sensitive material punched by the frame punch 34 at specified intervals is not cut but transported by the light-sensitive material transporter 35 including a multiplicity of transport roller pairs 35a and the transport guides (not shown). During transport through the transporter 35, back print information is recorded with a back printer 35b, after which the light-sensitive material is transported to the image recording section 38. During transport through the image recording section 38, loops 35c of the elongated light-sensitive material are formed before and after an auxiliary scan/transport means 38b comprising two transport roller pairs in order to avoid adverse effects on the digital scan exposure in the image recording section 38 including vibrations which may be caused by punching with the frame punch 34 and back printing with the back printer 35b prior to imagewise exposure, and various vibrations of the exposed light-sensitive material which may be caused during entry into the developing device 40, waiting or transport.

It should be noted that the invention is not limited to the case where the cut-marks are formed with the frame punch 34, and various cut marks can be used as exemplified by the printed cut-marks with the back printer as mentioned in the commonly assigned Japanese Patent Publication No. 9-133973.

The image recording section 38 subjects the elongated light-sensitive material to the digital scan exposure. After imagewise exposure, the exposed light-sensitive material is transported by the light-sensitive material transporter 33 to the developing device 40, where the wet development process including a color development and drying are performed. The processed and dried light-sensitive material is then cut according to the punches by the cutter 42 to obtain finished prints having the size of the composite image. The thus cut sheets are sorted in the developing device 40. The cutter 42 is preferably provided inside the developing device 40.

The digital photoprinter and the image recording device for use therein are disclosed in detail in the commonly assigned Japanese Patent Publication No. 9-133973 and U.S. Pat. No. 5,731,888.

The image reading and reproducing apparatus according to the first aspect of the invention is basically mentioned above. We now describe the operation thereof and the image reading and reproducing method according to the second aspect of the invention.

The description will be made as to a case that an image of Mt. Fuji is recorded on an ordinary negative film as shown in FIGS. 2a and 2b, the print size used of the image is a standard size, for example, L size (s×t=89 mm×127 mm) and a title region is added only on one side of the image of a photograph, specifically only on one side thereof in the transport direction of the light-sensitive material. However, the present embodiment is not limited thereto and the title regions may be added on both side of the image of the photograph in the transport (auxiliary scanning transport) direction.

An image of the film is read by the scanner 12 to which the negative film is set and the read digital input image signals are sent to the image processing section 18. The image processing section 18 subjects the image signals to image processing to create processed image data. On the other hand, when the photographed date, title and the like designated by a user are inputted by means of the keyboard 26a or the mouse 26b. The input signals are sent to the line image creating section 20 and digital line image data is created in the line image creating section 20. The image combining section 22 combines the processed image data with the line image data to create output composite image data.

When the output composite image data is created by combining the processed image data with the line image data, a title region where the line image data is recorded is provided along the transport direction of the light-sensitive material rearward of an image region where the processed image data is recorded. This image region is previously set a standard size, for example, L size (s×t shown in drawings). In this case, CPU 24 determines a print size of the composite image based on adjunctive information such as a size information and the like which the processed image data and the line image data to be combined contain and then determines a length in the auxiliary scanning transport direction (transport direction) of the light-sensitive material. On the other hand, a length in the main scanning direction of the light-sensitive material is set a width of the elongated light-sensitive material.

Therefore, when the light-sensitive material is transported in the direction shown by an arrow a in FIG. 2a, since the elongated light-sensitive material having the width s(89 mm) is used, the image combining section 22 creates the output composite image data for outputting a print 50 having a print size s×(t+α) in which a title region 54 having a size s×α is added to an image region 52 having the standard L size (s×t=89 mm×127 mm) on the short side thereof, as well as, CPU 24 determines the length in the transport direction of the light-sensitive material to t+α=(127+α) mm.

Further, when the light-sensitive material is transported in the direction shown by an arrow b in FIG. 2b, since the elongated light-sensitive material having the width t(127 mm) is used, the image combining section 22 creates the output composite image data for outputting a print 60 having a print size (s+α)×t in which a title region 64 having a size α×t is added to an image region 62 of the standard L size (s×t=89 mm×127 mm) on the long side thereof, as well as, CPU 24 determines the length in the transport direction of the light-sensitive material to s+α=(89+α) mm.

A photographed date, a title 64a, and/or a CI mark and the like are recorded in the title region 54 or 64.

It is also possible to write a certain length of a message or a certain size of illustration depending upon a value α to be set in the title region 54 or 64.

The information written in the title region 54 or 64 may be the one designated by the user among the standard information (such as headings frequently used in New York, animation characters, etc.) previously stored in the image processing device 14 (or CPU 24), the one inputted through the keyboard 26a or the mouse 26b according to the designation made by the user at a laboratory, or the characters, the pictures such as illustration or the like handwritten by the user and read by the hand scanner 28. Alternatively, the information written in the title region 54 or 64 may be the characters or the pictures stored in the magnetic recording media such as FD (floppy disk), or the one created or read and then stored in the other image processing device, or the characters or the pictures created by the computer or the other means.

When the APS film is used, the information recorded on the magnetic track thereof may be read out by the scanner 12 and used. In an ordinary film, an optically readable barcodes such as a DX code, an expanded DX code, an FNS code and the like may be previously recorded for representing various kinds of information.

As to the above title, it is easy in the APS film to provide each frame with a different title. It is also easy in the ordinary film for the user to provide each frame with a different title when reprints (extra prints) are made. Further, if the number of frames is known, it is possible to change a title for each frame even in a simultaneous print.

The created output composite image data is sent from the image combining section 22 to the image recording section 38 of the printer 16. On the other hand, the length in the transport direction of the light-sensitive material is sent from the CPU 24 to the cutter 32 and the light-sensitive material transporter 33.

In the printer 16, the cutter 32 cuts the light-sensitive material withdrawn from the magazine 36a to the length determined in the CPU 24, and the light-sensitive material transporter 33 transports the light-sensitive material which have been cut to sheets of the specified size corresponding to the print size to the image recording section 38, as shown in FIG. 5a. In the image recording section 38, the sheets of the light-sensitive material are subjected to a one-step digital scan exposure in accordance with the output composite image data to form latent images thereon. Thus, the exposed light-sensitive material on which the latent images are formed is transported by the light-sensitive material transport means 33 to the developing device 40, where the development process is performed to create finished prints.

It should be noted that the printer 16 may have the frame punch 34 and the light-sensitive material transporter 35 instead of the cutter 32 and the light-sensitive material transporter 33 and have also the additional cutter 42 provided in the end of the developing device 40, as shown in FIG. 5b. In this case, the elongated light-sensitive material having punches (cut-marks) formed by means of the frame punch 34 are transported without cutting by the light-sensitive material transporter 35 to the image recording section 38, where the one-step digital scan exposure is performed. The exposed elongated light-sensitive material is developed and dried in the developing device 40, after which the elongated light-sensitive material is cut by the cutter 42. In this case, the scan exposure is also performed at one step.

On which side of the image region (whether the long side or the short side) the title region is formed may be determined by the designation from the user. When, for example, the user designates to form the title region on the long side, a light-sensitive material having a width t=127 mm is used and cut to sheets of a length s+α in the transport direction, and thereby the print 60 as shown in FIG. 2b can be outputted.

In the first embodiment, since it suffices only to ordinarily output the processed image data associated with the predetermined standard size and subsequently output the line image data, the output composite image data can be very easily combined.

In addition, perforated tear-off lines 56, 66 may be formed on the prints 50, 60 between the image regions 52, 62 and the title regions 54, 64. According to the perforated tear-off line, the title region can be easily separated when it becomes unnecessary later.

In the examples shown in FIGS. 2a and 2b, the title regions 54, 64 are provided on the rear side of the image regions 52, 62 in the transport direction of the light-sensitive material. However, this is not the sole case of the invention and outputting of the title regions 54, 64 may be followed by outputting of the image regions 52, 62 so that the title regions 54, 64 are provided on the forward side in the transport direction of the light-sensitive material contrary to the illustrated case. Alternatively, the title regions 54, 64 may be provided on the right or left, or upper or lower side of the image regions. Further, the title regions 54, 64 may be provided on both sides, or forward and rear sides of the image regions 52, 62 in the transport direction of the light-sensitive material, that is, on the right and left sides, or upper and lower sides of the image regions 52, 62.

Next, as a second embodiment of the image reading and reproducing apparatus of the present invention, we now explain an apparatus to output finished prints having a title region around an image region as in a conventional photograph having a white edge as shown in FIG. 3 or FIG. 4.

An output print shown in FIG. 3 has a title region 74 formed around an image region 72 of an ordinary image output size, for example, an L size (89 mm×127 mm) in a print 70 of a larger size than the ordinary image output size, for example, a 2L size (s×t=127 mm×178 mm).

An output print shown in FIG. 4 has a title region 84 formed around an image region 82 of an ordinary image output size, for example, an L size (89 mm×127 mm) in a print 80 of a further larger size than the ordinary image output size, for example, an A4 size (s×t=210 mm×297 mm).

When the print size is increased to a certain extent as shown in the above examples, even if the original image of a photograph is outputted without changing the size thereof or with somewhat reducing the size thereof, it is possible to form a fairly large title region therearound.

In the image reading and reproducing apparatus 10 of the first embodiment of the invention or a usual image reading and reproducing apparatus, the image processing device 14 performs electric scaling to convert digital image data having a specified pixel density which have been read by the scanner 12 to output image data having an output pixel density and having the size of a finished print to be outputted, so that the finished print of which the image region has approximately the same width as that of the light-sensitive material used can be outputted. If a larger-sized light-sensitive material is used in the image reading and reproducing apparatus 10 of the first embodiment or the usual image reading and reproducing apparatus to obtain prints 70, 80 which are larger than the normal image output size, a larger-sized print image is obtained. Therefore, according to the invention, it is necessary to perform electric scaling by reducing the electric magnification of the print size to the size of the light-sensitive material used.

The image regions 72, 82 can be thus reduced with respect to the prints 70, 80 to provide the title regions around the image regions 72, 82.

In the second embodiment, as shown in FIG. 1 as in the first embodiment, the image of a photograph is also read from a negative film with a scanner 12 to obtain digital input image data and an image processing section 18 performs various image processing including an electronic magnification on the read image data to thereby create image data corresponding to the image region 72 or 82 subjected to the electronic magnification at a electronic magnitude in which that a size of the image region become smaller than a size (width) of an elongated light-sensitive material. On the other hand, line image data is created in a line image creating section 20 in accordance with the various indications by the user. The thus obtained image data and line image data are combined in the image combining section 22 so that the image data is reproduced in the image region 72 or 82 having a specified size and the line image data is reproduced in the title region 74 or 84. Then, the output composite image data is created in the image combining section 22.

A title 76, for example, "Full moon travel" or the like is recorded in the title regions 74, 84 in accordance with the image of a print as shown in FIG. 3. Otherwise, when the title region 84 is somewhat large as shown in FIG. 4, a little longer free message 84a, an illustration 84b such as an animation character or the like can be recorded in the title region 84.

The thus obtained output composite image data is sent to the printer 16. On the other hand, the CPU 24 determines the length in the auxiliary scanning transport direction of the light-sensitive material to be cut in accordance with the print size of the print 70 or 80 and sends the information of the length to the printer 16.

In the printer 16, the elongated light-sensitive material withdrawn from the magazine 36a by the withdrawing roller pair 36b is cut by the cutter 32 to the length in the transport direction which was determined by the CPU 24 and the cut sheets of the light-sensitive material are transported by the light-sensitive material transport means 33 to the image recording section 38, as shown in FIG. 5a. In the image recording section 38, the cut sheets of the light-sensitive material are exposed by one-step scanning with light beams deflected by the exposing unit 38a in the main scanning direction perpendicular to the auxiliary scanning direction and modulated in accordance with the output composite image data, while being transported by the auxiliary scan/transport means 38b in the auxiliary scanning direction. The thus exposed light-sensitive material is developed and dried in the developing device 40 to produce finished prints.

According to the second embodiment of the invention, the title regions 74, 84 are provided around the image regions 72, 82 so that users can write freely a message or a picture, whereupon not only aesthetic and decorative effect but also manageability and utility of finished photographs can be further improved. The title regions 74, 84 may be provided not on all the periphery but only on three sides of the image regions 72, 82.

It should be noted that, in this embodiment also, the light-sensitive material having cut-marks formed by the frame punch 34 may be transported to the image recording section 38 without cutting, as in the printer 16 shown in FIG. 5b.

The title region is formed in response to the optional indication by the user in both the first embodiment and the second embodiment and it is also possible to select whether or not the title region is formed for each frame. When, for example, the title region is formed only on one side or on both sides as shown in the first embodiment as described above, it can be simply separated along a perforated tear-off line when the title region becomes unnecessary later.

When the standard sentences and pictures are not stored in the CPU 24 and are downloaded from various kinds of software stored in the storing unit of an external host computer, the capacity of the storing unit in the CPU 24 can be saved.

While the apparatus and method for reading and reproducing image of the present invention has been described above in detail with respect to the various embodiments and examples, the present invention is by no means limited to the above embodiments and it goes without saying that various improvements and modification can be made within the scope which does not depart from the gist of the present invention.

As described above, according to the present invention, characters and pictures can be simply inserted on the surface of a print in accordance with the designation by a user without obstructing an image, whereby the print can be more effectively managed and the value for using it can be increased.

What is claimed s:

1. An image reading and reproducing apparatus comprising:

an image reader adapted to photoelectrically read an image carried on a film and obtain digital input image data;

an image processor adapted to subject said digital input image data to image processing steps and generate processed image data;

a line image acquirer adapted to acquire digital line data of a line image including at least one of a character and a picture;

an image combination unit adapted to combine said processed image data with said digital line image data to create output composite image data such that an image region where said image data carried on said film is recorded and a title region in addition to said image region are formed in a light-sensitive material and said line image is recorded in said title region; and an image recorder adapted to scan and expose said light-sensitive material in accordance with said output composite image data to record a composite image on said light-sensitive material.

2. The image reading and reproducing apparatus according to claim 1, which further includes:

an image size determination unit adapted to determine a length in an auxiliary scanning transport direction of the light-sensitive material on which said composite image is to be recorded in accordance with said processed image data, and said title region in which said line image is to be recorded in accordance with said line image data;

light-sensitive material cutter adapted to pre-cut an elongated light-sensitive material to the determined length; and transporter adapted to transport the cut light-sensitive material to said image recorder.

3. The image reading and reproducing apparatus according to claim 1, which further includes:

image size determining unit adapted to determine a length in an auxiliary scanning transport direction of the light-sensitive material on which said composite image is to be recorded, based on said image region in which said image is to be recorded in accordance with said processed image data, and said title region in which said line image is to be recorded in accordance with said line image data;

cut-mark forming device adapted to form a cut-mark for indicating the determined length on an elongated light-sensitive material; and transporter for transporting said elongated light-sensitive material having the formed cut-mark to said image recorder.

4. The image reading and reproducing apparatus according to claim 1, wherein said line image acquirer comprises a line image creating unit for creating said digital line image data of said line image.

5. The image reading and reproducing apparatus according to claim 1, wherein, when said at least one of the character and the picture contains handwritten material, said line image acquirer comprises a line image reader adapted to read said line image photoelectrically to obtain the digital line image data.

6. The image reading and reproducing apparatus according to claim 1, wherein, when said at least one of the character and the picture contains handwritten material, said line image acquirer comprises a line image creating unit adapted to create digital line image data of a portion of said line image and a line image reader adapted to read photoelectrically a remaining portion of said line image including said handwritten material to obtain the digital line image data.

7. The image reading and reproducing apparatus according to claim 1, wherein said title region is provided only on one side of said image region.

8. The image reading and reproducing apparatus according to claim 1, wherein said title region is provided on both sides of said image region.

9. The image reading and reproducing apparatus according to claim 1, wherein said title region is provided around said image region.

10. The image reading and reproducing apparatus according to claim 1, further comprising:

a controller adapted to control said image processor, said image reader, said line image acquirer, said image combination unit and said image recorder, and optionally an image size determining unit, together with a light-sensitive material cutter and a transporter, or a cut-mark forming device and transporter.

11. An image reading and reproducing method comprising:

photoelectrically reading an image carried on a film to obtain digital input image data;

subjecting said digital input image data to specified image processing to obtain processed image data;

acquiring digital line image data of a line image including at least one of a character, and a picture;

combining said processed image data with said digital line image data to create output composite image data in such a way that an image region where said image carried on said film is recorded and a title region in addition to said image region are formed in a light-sensitive material and said line image is recorded in said title region; and scanning and exposing said light-sensitive material in accordance with said output composite image data at one step to record a composite image on said light-sensitive material.

12. The image reading and reproducing method according to claim 11, further comprising:

determining a length in auxiliary scanning transport direction of the light-sensitive material on which said composite image including said processed image data and said line image data is to be recorded, based on said image region in which said image is to be recorded in accordance with said processed image data, and said title region in which said line image is to be recorded in accordance with said line image data;

previously cutting an elongated light-sensitive material to the determined length; and transporting the cut light-sensitive material to an image recorder;

wherein said image recorder scans and exposes said light-sensitive material in accordance with said output composite image data to record said composite image on said light-sensitive material which was previously cut.

13. The image reading and reproducing method according to claim 11, further comprising:

determining a length in auxiliary scanning transport direction of the light-sensitive material on which said composite image including said processed image data and said line image data is to be recorded, based on said image region in which said image is to be recorded in accordance with said processed image data, and said title region in which said line image is to be recorded in accordance with said line image data;

previously forming a cut-mark for indicating the determined length on an elongated light-sensitive material; and transporting said elongated light-sensitive material having the formed cut-mark to an image recorder;

wherein said image recorder scans and exposes said light-sensitive material in accordance with said output composite image data to record said composite image on said elongated light-sensitive material having said formed cut-mark.

14. The image reading and reproducing apparatus according to claim 11, wherein said digital line image data is at least one of the digital line image data created for said line image, and the digital line image data obtained by photo-electrically reading the line image including handwritten material as said at least one of the character and the picture.

15. The image reading and reproducing apparatus according to claim 11, wherein said title region is provided at least on one side of said image region, or around said image region.

16. The image reading and reproducing apparatus of claim 1, wherein said image processor further comprises:

a scaler adapted to convert said digital input image data with a first pixel density to digital output image data with a second pixel density and size corresponding to the corresponding image data to be outputted.

17. The image reading and reproducing apparatus of claim 1, wherein said image processor further comprises:

a magnetic reader adapted to read information magnetically recorded on said film.

18. The image reading and reproducing apparatus of claim 1, wherein said digital input image data and said output composite image data are color image data.

* * * * *

UNITED STATES PATENT AND TRADEMARK OFFICE
CERTIFICATE OF CORRECTION

PATENT NO.   : 6,373,996 B2
DATED        : April 16, 2002
INVENTOR(S)  : Morita, Naoyuki It is certified that error appears in the above-identified patent and that said Letters Patent is hereby corrected as shown below:

<u>Title page,</u>
Item [73], Assignee, change from "Minami-Ashigara (JP)" to
-- Kanagawa (JP) --

Signed and Sealed this

Eighteenth Day of February, 2003

JAMES E. ROGAN
*Director of the United States Patent and Trademark Office*